(12) United States Patent
Hwang

(10) Patent No.: US 12,463,291 B2
(45) Date of Patent: Nov. 4, 2025

(54) POUCH-TYPE BATTERY PACK HAVING FOLDING STRUCTURE AND MANUFACTURING METHOD THERE-OF

(71) Applicant: LG ENERGY SOLUTION, LTD., Seoul (KR)

(72) Inventor: Seong Ju Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 946 days.

(21) Appl. No.: 17/632,882

(22) PCT Filed: Dec. 30, 2020

(86) PCT No.: PCT/KR2020/019419
§ 371 (c)(1),
(2) Date: Feb. 4, 2022

(87) PCT Pub. No.: WO2021/145592
PCT Pub. Date: Jul. 22, 2021

(65) Prior Publication Data
US 2022/0278426 A1    Sep. 1, 2022

(30) Foreign Application Priority Data
Jan. 13, 2020 (KR) .................. 10-2020-0004181

(51) Int. Cl.
*H01M 50/503* (2021.01)
*H01M 10/48* (2006.01)
(Continued)

(52) U.S. Cl.
CPC ....... *H01M 50/503* (2021.01); *H01M 10/482* (2013.01); *H01M 50/211* (2021.01);
(Continued)

(58) Field of Classification Search
CPC ............ H01M 50/503; H01M 50/211; H01M 50/105; H01M 50/20; H01M 50/244;
(Continued)

(56) References Cited

U.S. PATENT DOCUMENTS

2008/0070102 A1    3/2008  Watanabe et al.
2013/0171485 A1    7/2013  Kodera et al.
(Continued)

FOREIGN PATENT DOCUMENTS

GB          2535546 A       8/2016
JP       2010-108794 A      5/2010
(Continued)

OTHER PUBLICATIONS

Extended European Search Report for Application No. 20914544.0 dated Sep. 27, 2022.
(Continued)

*Primary Examiner* — Sarah A. Slifka
(74) *Attorney, Agent, or Firm* — Birch, Stewart, Kolasch & Birch, LLP

(57) ABSTRACT

Discussed is a battery pack to which a folding structure is applied and a manufacturing method thereof, and more particularly, to a battery pack in which battery cells are connected in series using a connection plate in an unfolded state, then wrapped and fixed with individual housings, and a folding structure is applied to form a cell stack structure of the battery cells by folding the connection plate connecting the battery cells in that state and a manufacturing method thereof.

11 Claims, 7 Drawing Sheets

(51) Int. Cl.
  *H01M 50/211*  (2021.01)
  *H01M 50/244*  (2021.01)
  *H01M 50/51*   (2021.01)
  *H01M 50/519*  (2021.01)
  *H01M 50/522*  (2021.01)

(52) U.S. Cl.
  CPC ......... *H01M 50/244* (2021.01); *H01M 50/51* (2021.01); *H01M 50/519* (2021.01); *H01M 50/522* (2021.01)

(58) Field of Classification Search
  CPC .. H01M 50/51; H01M 50/519; H01M 50/522; H01M 10/482
  See application file for complete search history.

(56) References Cited

U.S. PATENT DOCUMENTS

| | | |
|---|---|---|
| 2013/0207612 A1 | 8/2013 | Lev et al. |
| 2013/0280596 A1 | 10/2013 | Lee et al. |
| 2014/0072832 A1 | 3/2014 | Lee et al. |
| 2016/0260944 A1 | 9/2016 | Heo |
| 2018/0175345 A1 | 6/2018 | Schmid-Schoenbein |

FOREIGN PATENT DOCUMENTS

| | | |
|---|---|---|
| JP | 2013-140707 A | 7/2013 |
| KR | 10-1999-0044976 A | 6/1999 |
| KR | 10-2007-0033983 A | 3/2007 |
| KR | 10-2009-0051132 A | 5/2009 |
| KR | 10-1170881 B1 | 8/2012 |
| KR | 10-2014-0035088 A | 3/2014 |
| KR | 10-2016-0003451 A | 1/2016 |
| KR | 10-2016-0017150 A | 2/2016 |
| KR | 10-2016-0049826 A | 5/2016 |
| KR | 10-2016-0088002 A | 7/2016 |
| KR | 10-2016-0107058 A | 9/2016 |
| KR | 10-1717197 B1 | 3/2017 |
| KR | 10-1816813 B1 | 1/2018 |

OTHER PUBLICATIONS

International Search Report (PCT/ISA/210) issued in PCT/KR2020/019419, dated Apr. 15, 2021.

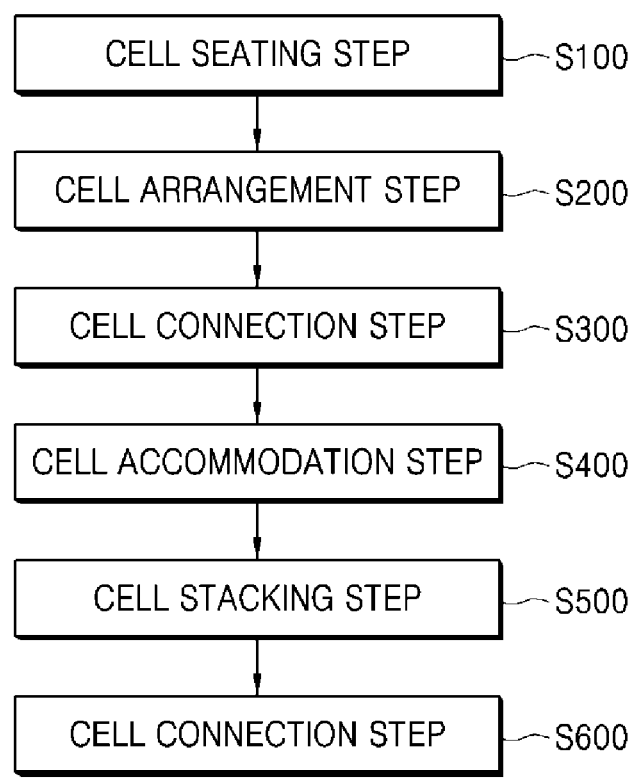

POUCH-TYPE BATTERY PACK HAVING FOLDING STRUCTURE AND MANUFACTURING METHOD THERE-OF

TECHNICAL FIELD

The present invention relates to a battery pack to which a folding structure is applied and a method of manufacturing the same, and more particularly, to a battery pack to which a stacking method of battery cells is applied using a folding structure and a method of manufacturing the same.

BACKGROUND ART

Recently, secondary batteries capable of charging and discharging are attracting attention not only as an energy source for various IT devices including mobile devices, but also as a power source for mid to large-sized devices such as electric vehicle (EV), hybrid electric vehicle (HEV), plug-in hybrid electric vehicle (Plug-In HEV), and the like.

Secondary batteries can be classified into cylindrical, rectangular, and pouch-types according to their shape, and here, the pouch-type secondary battery is attracting a lot of attention due to its advantages such as easy shape transformation according to products, low manufacturing cost, and small weight.

A pouch-type secondary battery 11 is a plate-shaped battery cell in which a positive electrode lead and a negative electrode lead are formed at ends, and has a structure in which an electrode assembly consisting of a positive electrode, a negative electrode, and a separator disposed between them is embedded inside the pouch-type secondary battery case and positive and negative terminals 12 and 13 protrude outside the pouch-type secondary battery case.

This pouch-type secondary battery is used in the form of a secondary battery pack 10 in which a plurality of secondary battery cells are connected in series or parallel to form a cell stack structure according to an output capacity required by the device.

When configuring the secondary battery pack 10 of a cell stack structure connected in series between secondary battery cells, as shown in FIG. 1, the positive and negative terminals 12 and 13 of the stacked secondary battery cells are alternately positioned so that electrode terminals having different potentials are adjacent to each other. Accordingly, when electrode terminals having different potentials contact each other, there is a problem in that an abnormal path is formed and a short occurs.

In addition, since the connection width between the series connection of the secondary battery cells is narrow, it is difficult to connect a sensing line for voltage measurement of each secondary battery cell.

(Patent Document 1) KR10-1816813 B1

DISCLOSURE

Technical Problem

The present invention is to solve the above-described problem, and is to provide a battery pack with a folding structure that fundamentally blocks the occurrence of short circuits when connecting pouch-type battery cells forming a stack structure and facilitates connection of a sensing line and a method of manufacturing the same.

Technical Solution

According to the present invention, a battery pack includes: at least two pouch-type battery cells in which first and second electrode terminals protrude from one side in the same direction; a housing configured to individually surround and fix the battery cells; and one or more connection plates disposed between battery cells accommodated in each housing to electrically and physically interconnect adjacent battery cells, wherein the connection plate connecting the battery cells is sequentially folded in a predetermined first and second direction to form a cell stack structure.

Specifically, the housing includes: a lower plate having a plate-shaped structure accommodating the first and second electrode terminals where a width corresponds to the battery cell and a length in a vertical direction protrudes from at least one side of the battery cell, the lower plate where each of the battery cells is seated; and an upper frame having a structure including an opening part with an area corresponding to a front of the battery cell and covering an area where a frame surrounding the battery cell and the first and second electrode terminals of the lower plate are accommodated, the upper frame being mounted on a front part of each of the battery cells electrically and physically connected by the connection plate and coupled to the lower plate in a state in which the battery cell is seated on the lower plate.

Moreover, the connection plate includes: a second electrode terminal connection part connected to a second electrode terminal of one battery cell and a first electrode terminal connection part connected to a first electrode terminal of another adjacent battery cell in a state in which each of the battery cells is seated on the lower plate and arranged in a row; and a folding part disposed between the first and second electrode terminal connection parts to electrically and physically connect the adjacent battery cells in series, wherein a bending part is formed at a boundary line between the first and second electrode terminals connection part and the folding part.

In addition, the connection plate includes a sensing line connection part protruding from the second electrode terminal connection part connected to the second electrode terminal of the one battery cell in the same direction as the electrode terminal of the battery cell to be connected to a sensing line for measuring a voltage of the battery cell, wherein a bending part is formed at a boundary line between the second electrode terminal connection part and the sensing line connection part.

Here, the folding part is folded in a predetermined first direction or second direction to form a cell stack structure, wherein a predetermined interval between the battery cells and a width of the folding part are set differently depending on in which direction the predetermined interval and the width are folded in the first direction or the second direction.

Furthermore, in a state in which each of the battery cells is accommodated in the housing, the first and second electrode terminal connection parts of the connection plates are located inside the housing, but the folding part and the sensing line connection part are located outside the housing.

The connection plate is composed of a metal plate or a Flexible PCB (FPCB).

According to the present invention, a method of manufacturing a battery pack includes: a cell seating step of seating battery cells to be connected in series on each lower plate; a cell arrangement step of arranging the battery cells seated on each lower plate in a row at a predetermined interval; a cell connection step of electrically and physically connecting the battery cells in series using the connection plate; a cell accommodation step of mounting an upper frame on a front part of each of the battery cells and accommodating the upper frame in a housing in a state in which the battery cells are connected in series; and a cell stacking step of sequentially folding a folding part of the connection plate connecting the battery cells in a predetermined first and second direction to form a cell stack structure in a state in which the battery cells are stored in each housing.

Moreover, the method further includes a circuit connection step of connecting a sensing line to a sensing line connection part after folding the sensing line connection part of the connection plate protruding out of the stacked housings to a front surface of the stacked housings and allowing the sensing line connection part to contact the front surface.

Here, the connection plate is composed of a metal plate or a Flexible PCB (FPCB).

In addition, the battery cell is a pouch-type in which first and second electrode terminals having different polarities protrude in the same direction.

Advantageous Effects

In the present invention, since the battery cells are connected in series in the unfolded state, and then stacked while being wrapped and fixed by individual housings, individual housing protects the battery cells and insulates the electrode terminals adjacent to each other and having a potential difference, so that there is an effect of fundamentally preventing the occurrence of short circuits between battery cells.

In addition, a tab connected to a sensing line and a power path for measuring the voltage of each battery cell is positioned outside the housing in which the stack structure is formed, thereby facilitating circuit connection.

In addition, since the battery cells are connected in series in an unfolded state, it is possible to easily connect additional battery cells as necessary.

DESCRIPTION OF DRAWINGS

FIG. 10 is a flowchart showing a method of manufacturing a battery pack according to the present invention.

MODE FOR INVENTION

Figure 1:
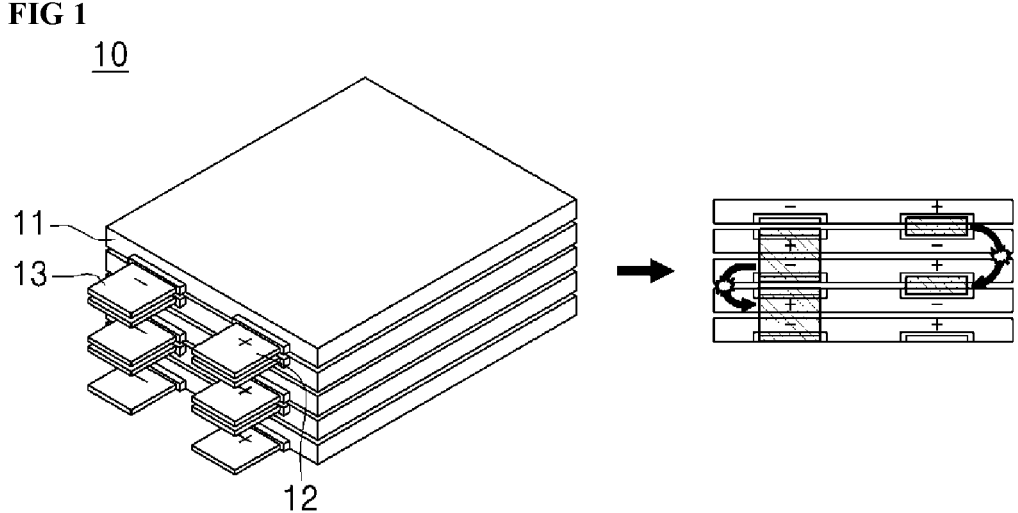
FIG. 1 is a diagram schematically showing a structure of a conventional battery pack.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Hereinafter, the present invention will be described in detail with reference to the drawings.

1. Battery Pack According to Invention

The battery pack 100 according to the present invention includes the following configuration.

1.1. Battery Cell 110

The battery pack 100 includes a plurality of battery cells 110. Each of the battery cells 110 may be electrically connected in series by a connection plate 130 to be described later and be accommodated/mounted in the individual housing 120 to be folded, thereby forming a cell stack structure.

Here, the battery cell 110 may be a pouch-type consisting of a structure in which an electrode assembly capable of charging and discharging is sealed in an exterior material, and electrode terminals 112 and 114 electrically connected to the electrode assembly partially protrude to the outside of the exterior material.

1.2. Housing 120

The housing 120 is a configuration in which the battery cells 110 are stored/mounted, and as described above, the battery cells 110 may be stored/installed in the individual housing 120 in a state in which they are electrically connected in series.

In the present invention, the battery cells 110 are stored/mounted in the individual housing 120 in a state in which they are electrically connected in series, and while the housing 120 protects each battery cell 110, when the battery cells 110 are stacked, it may play a role of preventing contact between electrode terminals having different potentials.

The housing 120 of the present invention includes the following configuration.

A. Lower Plate 122

Figure 2:
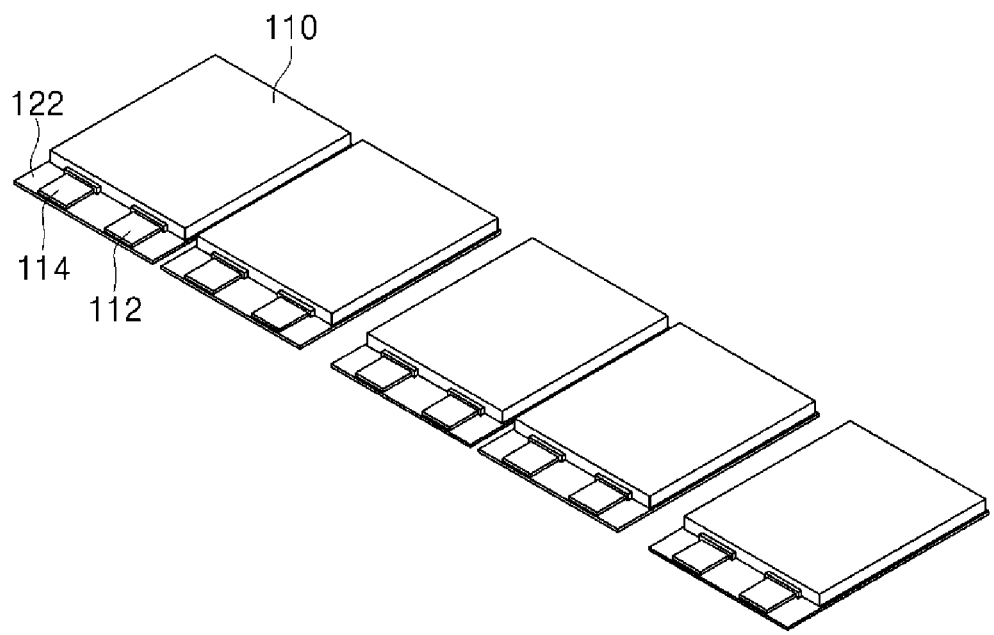
FIG. 2 is a view showing a state in which a battery cell is seated on a lower plate according to the present invention.

The lower plate 122 is a configuration in which the battery cells 110 are seated, and has a plate-shaped structure as shown in FIG. 2, and the width corresponds to the battery cell 110, but the length in the vertical direction may be configured to accommodate the electrode terminals 112 and 114 protruding from one side of the battery cell 110.

In a state in which the battery cells 110 are seated on each of the lower plates 122 and arranged in a row, the battery cells 110 arranged in a row may be electrically connected in series by welding the connection plates 130 to be described later to the first and second electrode terminals 112 and 114 of the battery cell.

B. Upper Frame 124

The upper frame 124 is mounted on the front part of the battery cell 110 while seated on the lower plate 122 and is coupled to the lower plate 122, so that the battery cell 110 is accommodated/mounted in the housing 120.

Such an upper frame 124 includes an opening part (not shown) having a corresponding area so that the front surface of the battery cell 110 can be exposed, and has a structure covering an area in which the first and second electrode terminals 112 and 114 of the battery cell are received in the frame surrounding the circumference of the battery cell 110 and the lower plate. Here, covering the area in which the first and second electrode terminals 112 and 114 are accommodated means covering the rest area of the lower plate in the direction of the first and second electrode terminals from one surface of the battery cell on which the first and second electrode terminals 112 and 114 are formed in the entire area of the lower plate.

The upper frame 124 welds the connection plate 130 to each of the first and second electrode terminals 112 and 114 of the battery cells seated on the lower plate 122 of an individual housing, and after electrically connecting the battery cells 110 in series, it is mounted on the front part of the battery cell 110 seated on the lower plate 122, and by receiving the welding connection area between the first and second electrode terminals 112 and 114 of each battery cell 110 and the connection plate 130 into the housing 120, when forming a cell stack structure, it is possible to fundamentally prevent the problem of short circuit caused by contact between different potentials.

Figure 5:
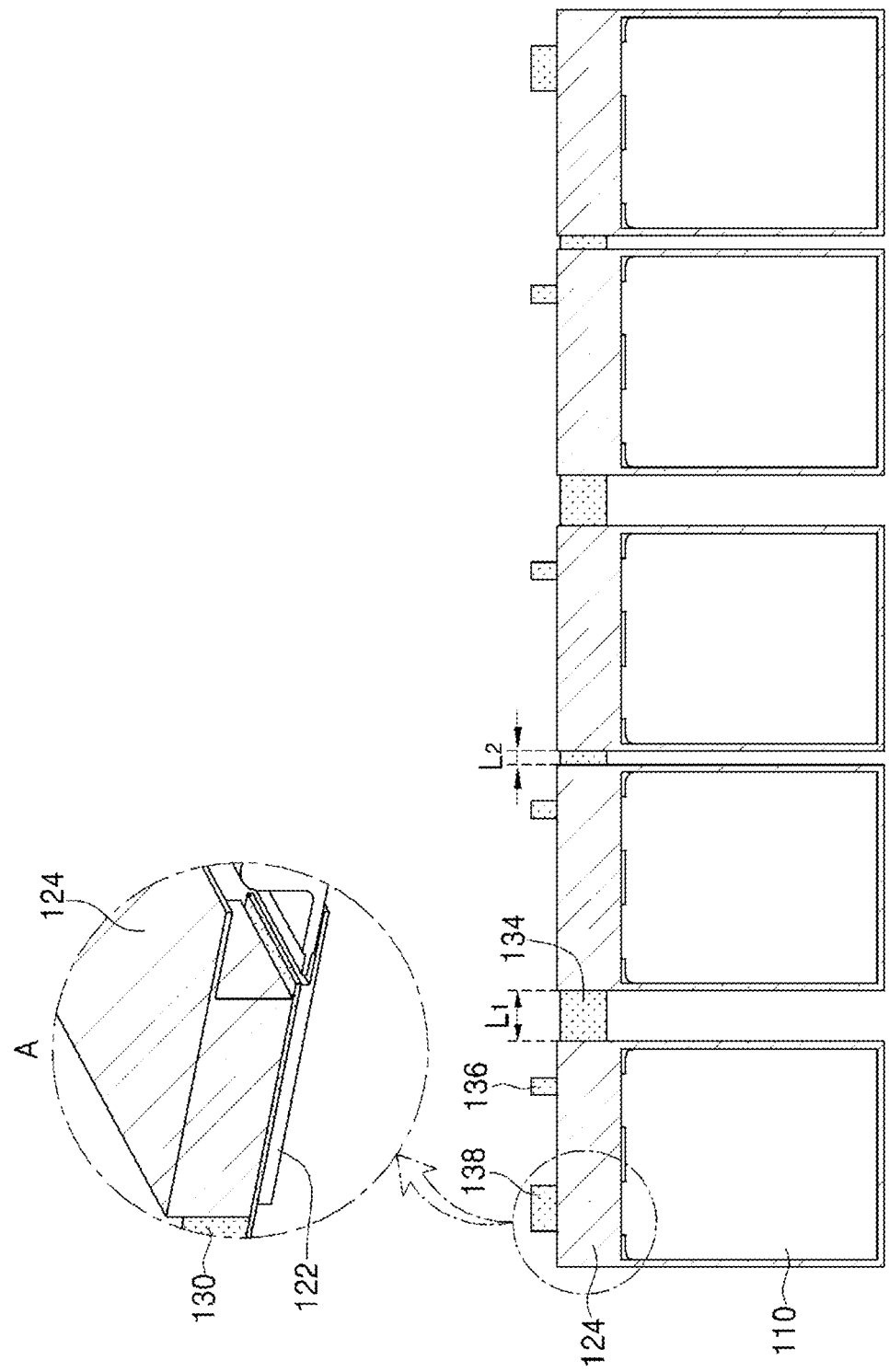
FIG. 5 is a view showing a structure in which each upper frame is mounted in the state of FIG. 3, and an enlarged view A is an enlarged view of the connection area between the battery cell and the connection plate, when viewed from the side of the connection structure between the upper frame and the lower plate.

In addition, as shown in the enlarged view A showing a state in which the upper frame 124 of FIG. 5 is coupled to the electrode terminal receiving area 122a of the lower plate 122 from the side, so that the battery cell 110 and the connection plate 130 positioned therebetween are in close contact and fixed to effectively prevent flow.

1.3. Connection Plate 130

The connection plate 130 is a configuration to allow the battery cells 110 connected in series to be folded to form a cell stack structure while electrically connecting the battery cells 110 arranged in a row as seated on the lower plate 122 in series. The connection plate may use, for example, a metal plate made of a metal made of Nickel, Ni-top, Cu, and Cu alloy material. In addition, when a flexible PCB (FPCB) wrapped with a polyimide (PI)-film is used outside the metal, insulation can be further enhanced.

Such a connection plate includes the following configuration.

A. Electrode Terminal Connection Part 132

The electrode terminal connection part is a welding connection area with the electrode terminal of the battery cell 110 and is electrically connected to the battery cell 110 through this.

Specifically, if the electrode terminal located on the left of the electrode terminals of the battery cell 110 is referred to as the first electrode terminal 112, the electrode terminal located on the right side is referred to as the second electrode terminal 114, the first electrode terminal may be a positive terminal or a negative terminal, and the second electrode terminal may also be a positive terminal or a negative terminal. However, the first electrode terminal and the second electrode terminal have different polarities, and for example, when the first electrode terminal is the positive terminal, the second electrode terminal will be the negative terminal.

In this specification, it is described that the first electrode terminal is the positive terminal and the second electrode terminal is the negative terminal, and it is described that the connection area with the positive terminal is classified as a first electrode terminal connection part 132a, and the connection area with the negative terminal is classified as a second electrode terminal connection part 132b.

The electrode terminal connection part is formed by welding with the positive terminal 112 and the negative terminal 114 of each battery cell 110, respectively, and may be electrically connected to the corresponding battery cell 110 through this.

At this time, when the battery cells 110 arranged in a row are sequentially referred to as a first battery cell, a second battery cell, . . . , an Nth battery cell from the left, the first electrode terminal connection part 132a, which is a connection area with the positive terminal of the first battery cell 110a, and the second electrode terminal connection part 132b, which is a connection area with the negative terminal of the Nth battery cell 110n are independently formed, and among the electrode terminal connection parts of the remaining electrode terminals located between them, the electrode terminal connection parts of the adjacent battery cells are connected, so that the first to Nth battery cells may be electrically connected in series.

Figure 3:
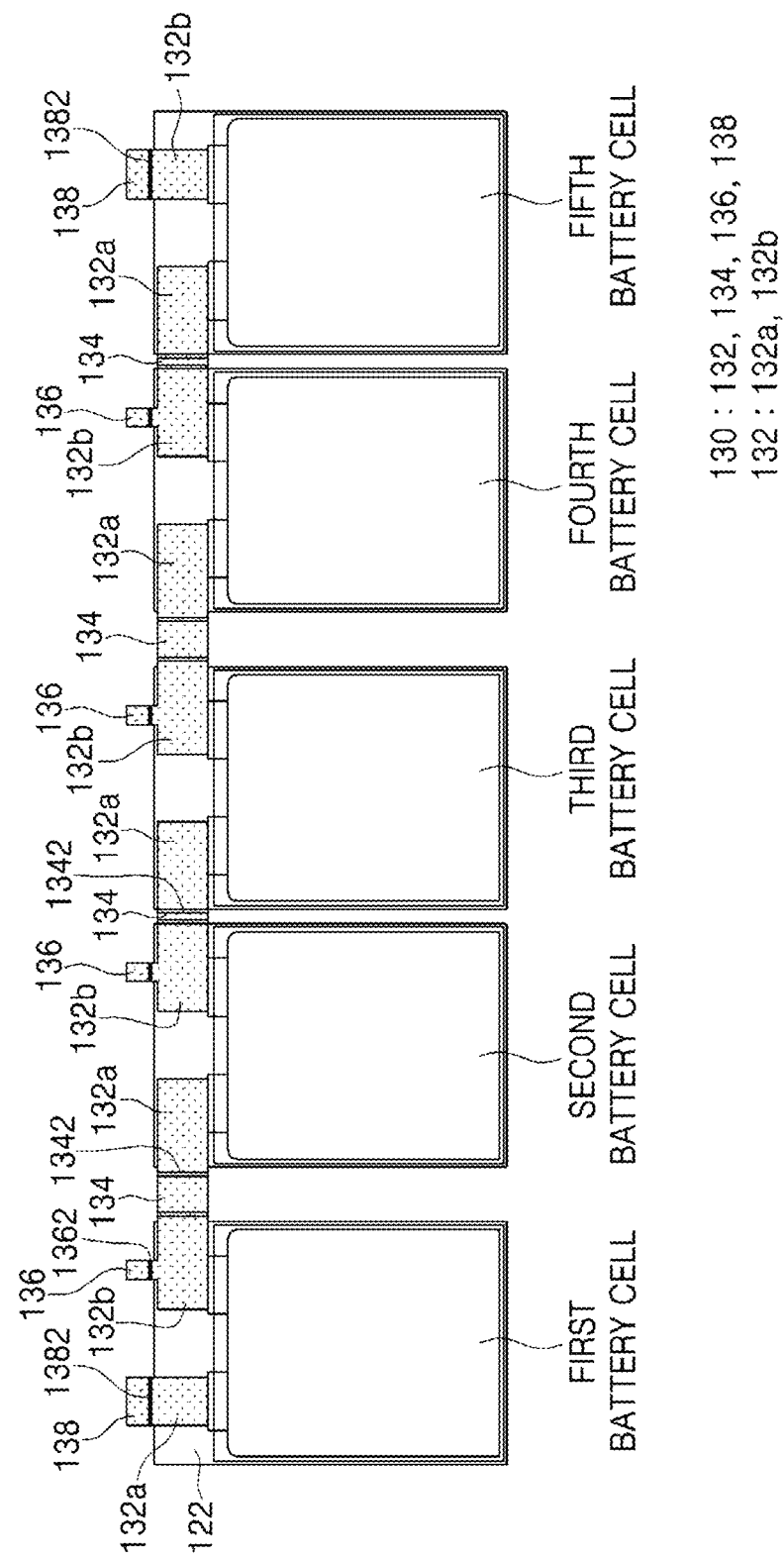
FIG. 3 is a view showing a structure in which battery cells are connected using a connection plate according to the present invention.

For example, when trying to connect five battery cells as shown in FIG. 3, among the battery cells arranged in a row, the first electrode terminal connection part 132a of the first battery cell located on the leftmost side and the second electrode terminal connection part 132b of the fifth battery cell located on the rightmost side are independently formed, and the second electrode terminal connection part 132b of the first battery cell and the first electrode terminal connection part 132a of the third battery cell are connected by a folding part 134 configured therebetween. In addition, the second electrode terminal connection part 132b of the second battery cell and the first electrode terminal connection part 132a of the third battery cell are also connected by a folding part 134 configured therebetween. This form is repeated until the second electrode terminal connection part 132b of the fourth battery cell and the first electrode terminal connection part 132a of the fifth battery cell, through which the first to fifth battery cells are electrically connected in series.

B. Folding Part 134

The folding part is a form of connecting two electrode terminal connection parts having different polarities between one battery cell and adjacent battery cells, as described above, and electrically connects the battery cells 110 in series and also performs a function of physically connecting the battery cells 110 accommodated in the individual housing 120.

Figure 4:
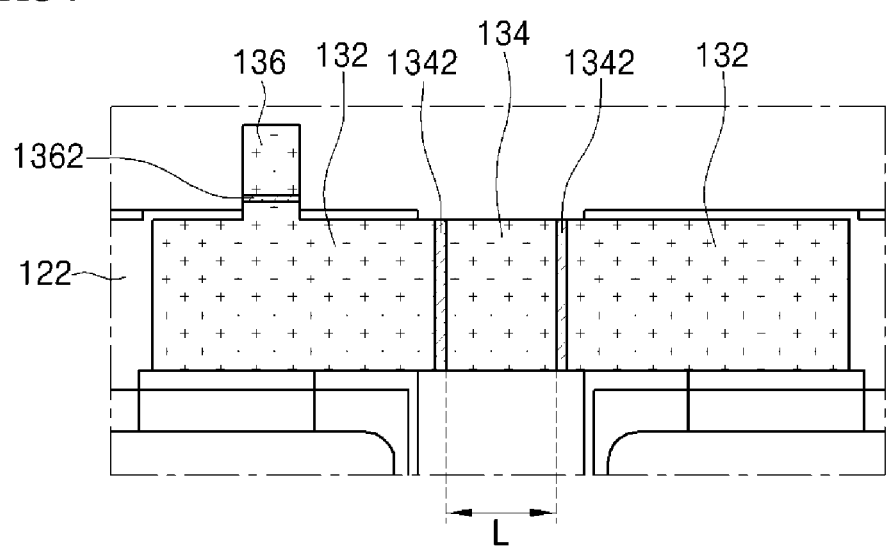
FIG. 4 is an enlarged view illustrating a connection structure between battery cells using a connection plate.

Referring to FIGS. 3 and 4, the folding part connects the second electrode terminal connection part 132b of the first battery cell and the first electrode terminal connection part 132a of the second battery cell, and connects the second electrode terminal connection part 132b of the second battery cell and the first electrode terminal connection part 132a of the third battery cell. In addition, the second electrode terminal connection part 132b of the third battery cell and the first electrode terminal connection part 132a of the fourth battery cell are connected, and the second electrode terminal connection part 132b of the fourth battery cell and the first electrode terminal connection part 132a of the fifth battery cell are connected. Through this, the first to fifth battery cells may be electrically connected in series.

Also, as shown in FIG. 5, in a state in which the first to fifth battery cells are respectively accommodated in the individual housings 120, they perform a function of physically connecting to adjacent battery cells, and are folded in a predetermined direction to form a cell stack structure.

Figure 6:
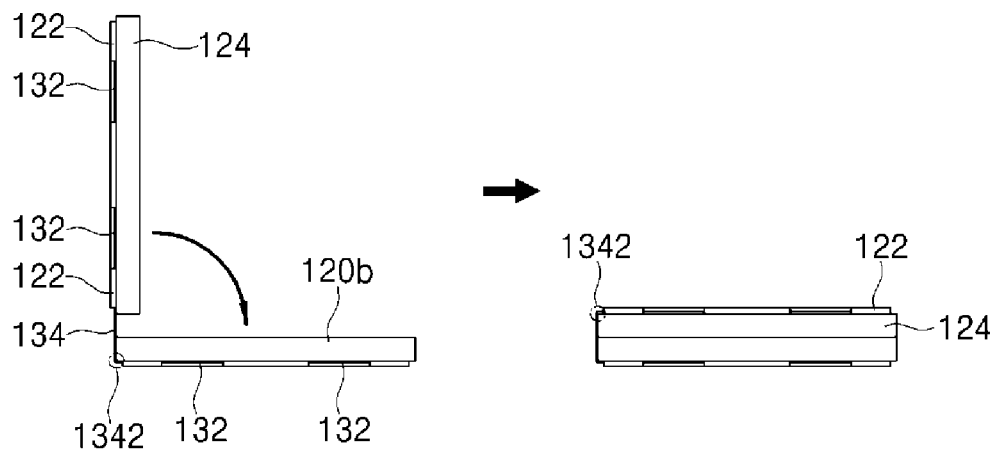
FIG. 6 is a view showing a state of being folded in a first direction using a folding part.

Here, referring to FIG. 4, a bending part 1342 may be formed at both corners of the folding part, that is, at a boundary line between the electrode terminal connection parts to facilitate folding of the connecting plate according to the cell stack structure. By bending the boundary line with the electrode terminal connection part to form a bending part 1342, as shown in FIG. 6, when both individual housings 120 connected by the folding part 134 of the connection plate 130 are folded, they can be flexibly bent well.

On the other hand, the interval (distance) between the bending parts 1342 formed at both corners of the folding part, that is, the width L of the folding part, may vary depending on the direction in which the folding part 134 is folded according to the cell stack structure.

For example, if the first housing 120*a* and the second housing 120*b* are folded in a direction (first direction) where each front part contacts, the width of the folding part 134*a* between the first housing 120*a* and the second housing 120*b* may be set to a predetermined first length L1. At this time, as shown in FIG. 6, when both individual housings 120 are folded in the first direction around the folding part, since the folding part 120 is in contact with the side surfaces of the upper frame 124 of both housings 120 to accommodate the side surfaces of the first and second housings 120*a* and 120*b*, the predetermined first length L1 should be set to such an extent that the side surfaces of the first and second housings 120*a* and 120*b* can be accommodated.

On the other hand, if the second housing 120*a* and the third housing 120*b* are folded in a direction in which each front part does not contact (the second direction), the width of the folding part 134*a* between the first housing 120*a* and the second housing 120*b* may be set to a predetermined second length L2. In this case, the folding part 134*a* may be set to such an extent that each lower plate of the second and third housings 120*a* and 120*b* contacts.

The width L of the folding part 134 set as described above may have the same meaning as the interval between the battery cells 110.

In other words, the interval between the battery cells 110 and the width L of the folding part 134 are set differently according to the direction in which the housings 120 are folded according to the cell stack structure, and the predetermined first length L1 has a value greater than the second length L2.

Figure 7:
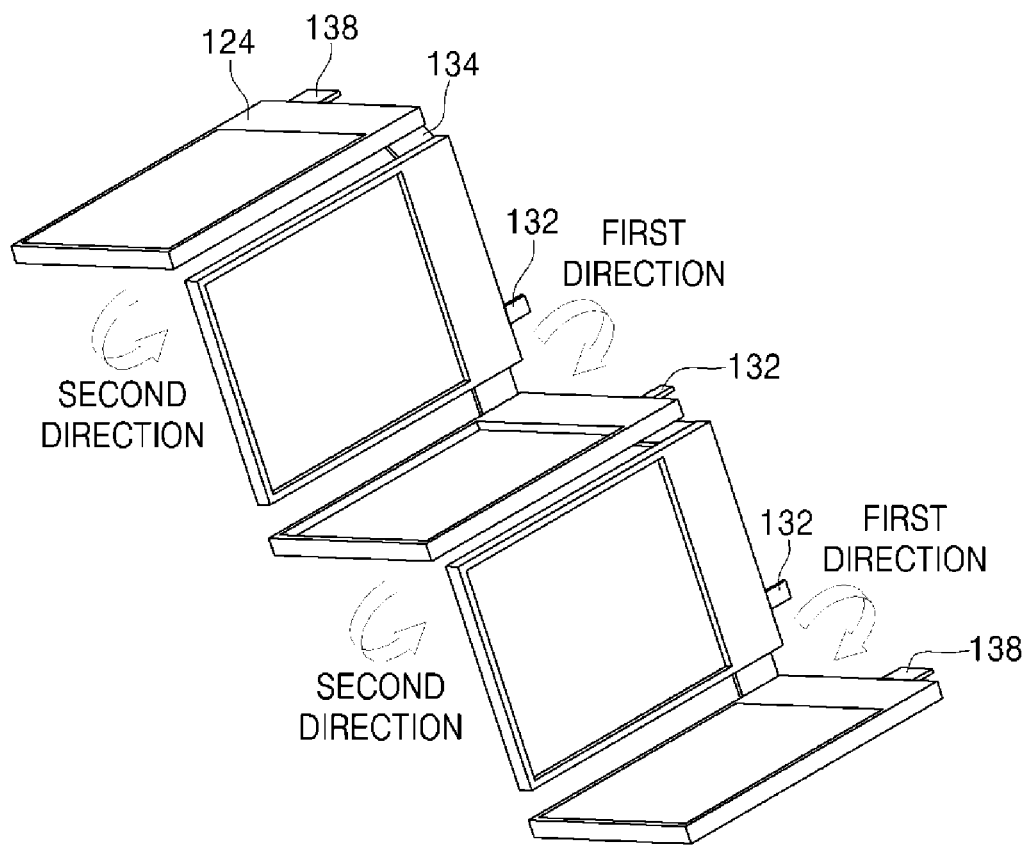
FIG. 7 is a view showing a state of being folded in a state received in an individual housing.

Accordingly, the folding part 134 between the individual housings 120 having a predetermined first length L1 and a second length L2 is folded in the first and second directions, i.e., in zigzag as shown in FIG. 7, so that it is possible to form a cell stack structure.

C. Sensing Line Connection Part 136

The sensing line connection part is a configuration in which a voltage sensing line for measuring the voltage of each battery cell 110 is connected, and may protrude from the electrode terminal connection part having the same polarity for each battery cell. For example, it is formed to protrude upward from the second electrode terminal connection part 132*b* of the battery cell and extend out of the lower plate 122 of the housing 120, and when the upper frame 124 is mounted, it has a structure that is exposed to the outside of the housing 120.

In this case, the sensing line connection part is not configured in the Nth battery cell located at the rightmost among the battery cells arranged in a row.

As shown in FIGS. 3 and 5, it is configured in a shape extending protruding from the second electrode terminal connection part 132*b* of the first battery cell, the second electrode terminal connection part 132*b* of the second battery cell, the second electrode terminal connection part 132*b* of the third battery cell, and the second electrode terminal connection part 132*b* of the fourth battery cell to be out of each lower plate 122 and is not configured in the fifth battery cell arranged last.

Figure 8:
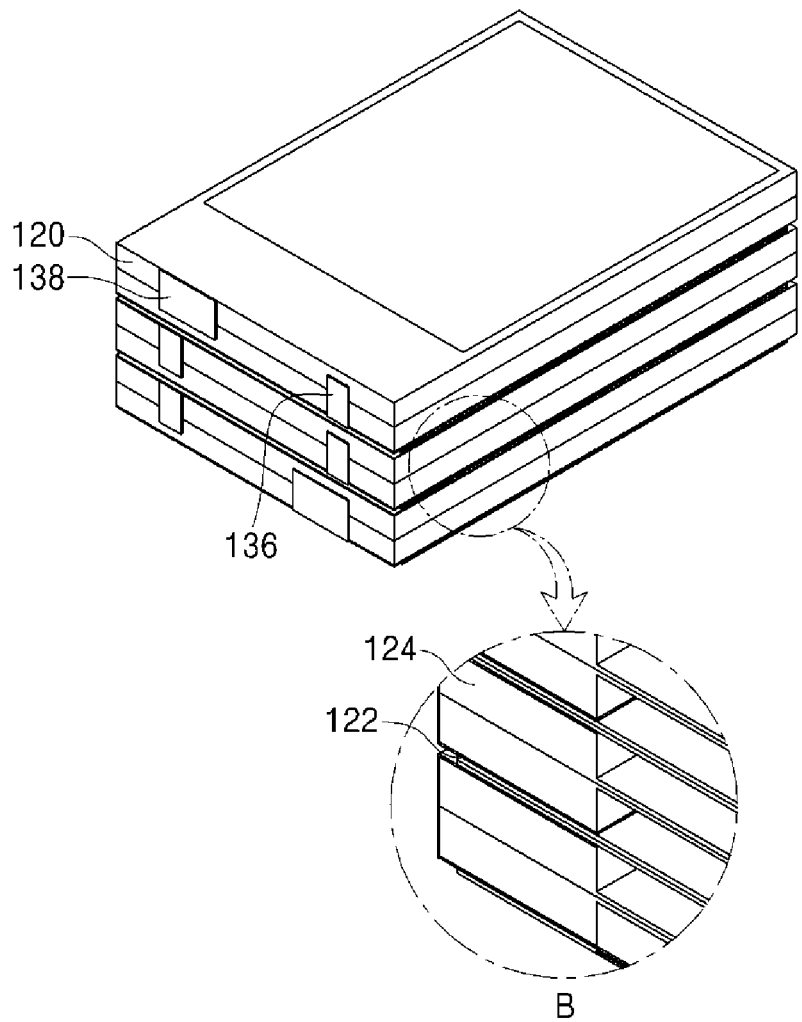
FIG. 8 is a view showing a state in which the cell stack structure is formed through FIG. 7, and an enlarged view B is an enlarged view showing a part of the stacked state.

On the other hand, by bending the boundary line between the sensing line connection part and the second electrode terminal connection part 132*b* to form a bending part 1362, when forming a cell stack structure, by folding the sensing line connection part protruding toward the outside of the housing 120 in the surface direction of the stacked housings 120 as shown in FIG. 8, so that it is possible to make it easy to connect a sensing line for measuring the voltage of each battery cell while keeping the appearance neat.

Figure 9:
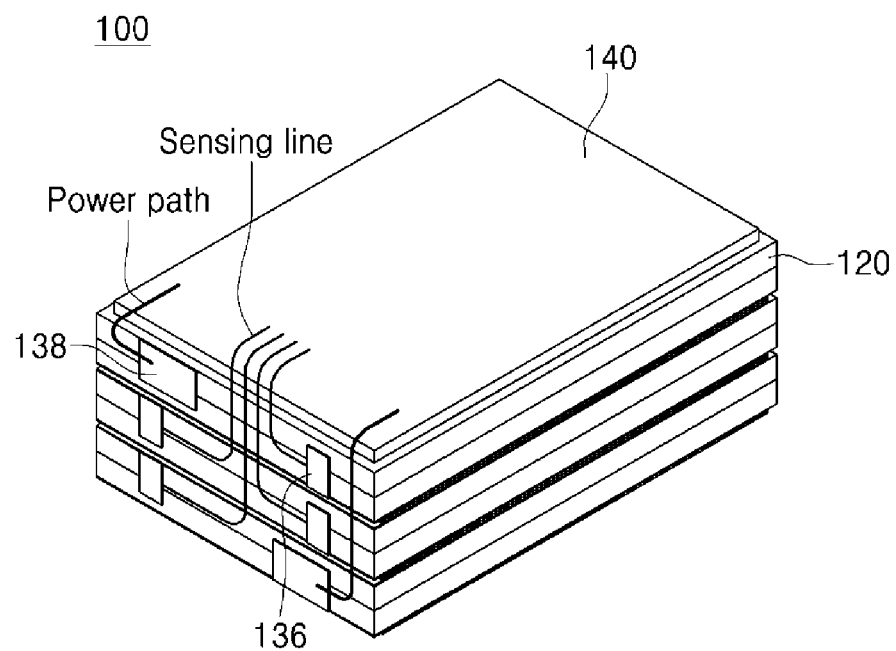
FIG. 9 is a diagram schematically showing a state in which BMS connection is completed in the state of FIG. 8.

Such a sensing line connection part is configured to be located outside the housing 120 as shown in FIGS. 5 and 8 when the upper frame 124 is mounted, and even when the cell stack structure is formed, since the sensing line connection part of each battery cell is located outside the individual housing 120, it is easy to connect a sensing line for measuring the voltage of each battery cell as shown in FIG. 9, and furthermore, the connection between the sensing line and the BMS 140 may be easily performed.

D. Power Connection Part 138

The power connection part is a configuration in which battery cells connected in series and a power path for connection with the BMS 140 are connected, and this may be configured to protrude from each of the first electrode terminal connection part of the first battery cell and the second electrode terminal connection part of the Nth battery cell among battery cells arranged in a row.

For reference, since the first battery cell and the Nth battery cell are located in the lowest and highest layers or the highest and lowest layers when the cell stack structure is formed, a power connection part to which a power path is connected is configured in the first battery cell and the Nth battery cell.

For example, as shown in FIG. 3, in a state in which the battery cells are arranged in a row, it is preferable that they are formed to protrude and extend from the first electrode terminal connection part 132*a* of the first battery cell and the second electrode terminal connection part 132*b* of the fifth battery cell located at the outermost side, respectively.

Here, among the battery cells arranged in a row, the first electrode terminal connection part 132*a* of the first battery cell located at the outermost side and the power connection part 138 extending therefrom may be referred to as one electrode tab extension part, and the second electrode terminal connection part 132*b* of the Nth battery cell and the power connection part 138 extending therefrom may also be referred to as one electrode tab extension part.

Since the electrode tab extension part serves to connect the power path to the BMS 140, not to electrically and physically connect the battery cells adjacent to the connection plate 130, the first electrode terminal connection part 132*a* of a first battery cell located at the outermost part and a power connection part 138 extending therefrom and the second electrode terminal connection part 132*b* of the Nth battery cell and the power connection part 138 extending therefrom each are referred to as one electrode tab extension part.

Similar to the above-described sensing line connection part 136, such a power connection part is formed so as to be out of the lower plate 122 and has a structure exposed to the outside of the housing 120 as shown in FIG. 5 when the upper frame 124 is mounted.

On the other hand, as the boundary line between the power connection part and the first electrode terminal connection part 132*a* of the first battery cell and the first electrode terminal connection part 132*a* of the Nth battery cell is bent to form a bending part 1382, when forming a cell stack structure, by folding the power connection part protruding outside the housing 120 in the surface direction of the stacked housing 120 as shown in FIG. 8, it is possible to facilitate the connection of the power path for connection to the BMS while keeping the appearance neat.

Therefore, it is configured to be exposed to the outside of the housing 120 when the upper frame 124 is mounted, and thus even if the cell stack structure is formed, since it is located outside the individual housing 120 of the first and Nth battery cells, it is possible to easily connect a power path for connection to the BMS 140.

In this way, instead of stacking battery cells in series and connecting them in series, after placing the battery cells on the lower plate and arranging them in a line and connecting the battery cells in series and physically using the above-described connection plate, in the present invention, an upper frame is mounted on the front part of the lower plate, and the battery cells are folded in a zigzag while being accommodated in the individual housing to form a cell stack structure. Therefore, in addition to stably fixing and protecting each battery cell by an individual housing, it may have an effect of fundamentally blocking the occurrence of a short due to contact between electrode terminals having different potentials between the series connection of the battery cells forming the conventional cell stack structure.

In addition, since the battery cells are connected in series in the unfolded state, the battery cells can be easily additionally connected if necessary.

In addition, a configuration for connecting a sensing line and a power path for measuring the voltage of each battery cell connected to the BMS to a connection plate that electrically and physically connects the battery cells is formed to be located outside the housing in the same direction, so that connection with the BMS can be facilitated.

2. Battery Pack Manufacturing Method According to Present Invention (Refer to FIG. 10)

The method of manufacturing a battery pack according to the present invention may be configured including the following steps.

2.1. Cell Seating Step S100

The cell seating step is a step of seating a plurality of battery cells 110 to be connected in series on the lower plate 122 of the individual housing 120.

At this time, as shown in FIG. 2, the electrode terminals 112 and 114 of all battery cells 110 to be connected in series are mounted so that they face the same direction.

2.2. Cell Arrangement Step S200

The cell arrangement step is a step of arranging the battery cells 110 in a row seated on the lower plate 122 of the individual housing 120 through the cell seating step (S100).

In this case, when the battery cells 110 respectively seated on the lower plate 122 of the housing 120 are arranged in a row, the battery cells 110 may be arranged at a predetermined interval.

Here, the predetermined interval may be set in consideration of the folding direction when forming a cell stack structure of the battery cells 110 accommodated in the individual housing 120 in a series connected state through the connection plate 130 in the cell stacking step S500 to be described later 2.3. Cell Connection Step S300

The cell connection step is a step of electrically connecting the battery cells 110 arranged in a row while seated on the lower plate 122 of the individual housing 120 in the cell arrangement step S200 in series using the connection plate 130.

Here, as described above, the connection plate 130 may be composed of, for example, a metal plate made of a metal made of a nickel, Ni-top, Cu, and Cu alloy material, or a Flexible PCB (FPCB) wrapped around a polyimide (PI)-film outside the metal.

For example, when trying to connect five battery cells as shown in FIG. 3, the connection plate 130 is welded to the first electrode terminal of the first battery cell and the second electrode terminal of the fifth battery cell located at the leftmost of the battery cells arranged in a row to form the first electrode terminal connection part 132*a* and the second electrode terminal connection part 132*b*, and by welding the connection plate 130, which is composed of a folding part 134 connecting both electrode terminals, to the electrode terminals adjacent to each other between them, that is, the second electrode terminal of the first battery cell and the first electrode terminal of the second battery cell, the second electrode terminal of the second battery cell and the first electrode terminal of the third battery cell, the second electrode terminal of the third battery cell and the first electrode terminal of the fourth battery cell, and the second electrode terminal of the fourth battery cell and the first electrode terminal of the fifth battery cell, the first to fifth battery cells are electrically connected in series.

2.4. Cell Accommodation Step S400

The cell accommodation step is a step in which the upper frame 124 of the housing 120 is mounted on the front part of each of the battery cells 110 to accommodate all the battery cells 110 in the individual housing 120 in a state in which the battery cells 110 are electrically connected in series through the cell connection step S300, As mentioned above, the upper frame 124 of the housing 120 has a frame-shaped structure that surrounds the battery cell 110 and covers the welding area between the electrode terminals 112 and 114 and the connection plate 130, and the state in which the upper frame 124 is mounted on the battery cells 110 respectively seated on the lower plate 122 is as shown in FIG. 5.

At this time, as described above, if the battery cells 110 are accommodated in the individual housing 120 by mounting the upper frame 124, only the configuration of the folding part 134 of the connection plate 130 electrically and physically connecting the battery cells, the sensing line connection part 136 of the connection plate 130 to which the voltage sensing line of each battery cell is connected, and the power connection part 138 of the connection plate 130 to which the power path is connected is exposed to the outside of the housing 120, and in addition, the electrode connection part 132 and the like, which are welding areas between the electrode tabs, electrode terminals, and electrode terminals of the battery cell and the connection plate 130, are located inside the housing 120, so that each battery cell 110 is protected by the housing 120.

In this way, by electrically connecting the battery cells 110 in series and then mounting/storing them in the individual housings 120, the battery cell 110 is stably fixed and protected by the housing 120, and in the case of forming a cell stack structure, it is possible to fundamentally prevent a short circuit caused by contact between different potentials.

2.5. Cell Stacking Step S500

The cell stacking step is, as described above, a step of forming a cell stack structure by folding the folding part 134 of the connection plate 130 that is exposed to the outside of the housing 120 and connects the adjacent housings 120 to each other in a predetermined direction in a state in which the battery cells 110 electrically connected in series through the cell accommodation step S400 are accommodated in the individual housing 120.

Here, since the bending part 1342 is formed at the boundary line between the electrode terminal connection part 132 and the folding part 134 of the connection plate 130, the housings 120 are easily folded so that they come into contact with each other.

Meanwhile, the width L of the folding part 134 may be set differently depending on whether it is folded in the first direction or the second direction as described above.

In such a way, as shown in FIG. 7, the folding part 134 of the connection plate 130 can be folded in zigzag in the first and second directions to form a cell stack structure as shown in FIG. 8, and at this time, all the battery cells 110 constituting the cell stack structure are adjacent to each other by individual housings 120 as shown in the enlarged view B of FIG. 8, and are insulated between electrode tabs/electrode terminals with a potential difference to fundamentally prevent the occurrence of a short circuit.

2.6. Circuit Connection Step S600

The circuit connection step is a step of connecting the sensing line connection part 136 of the connection plate 130 located outside the housing 120 and the sensing line connected to the BMS 140 in the power connection part 138 and the power path as shown in FIG. 9 in a state in which the housing 120 is folded in zigzag using the folding part 134 of the connection plate 130 to form a cell stack structure in the cell stacking step S500.

At this time, when forming the cell stack structure, after folding the sensing line connection part 136 and the power connection part 138 protruding out of the housing 120 in the direction of the stacking surface of the housings 120 to allow them to contact, by connecting the sensing line and the power path, the appearance is neat and the circuit connection is made easier. Here, the bending parts 1362 and 1382 are formed on the boundary line between the electrode terminal connection part 132 of the connection plate 130 and the sensing line connection part 136, and the boundary line between the electrode terminal connection part 132 and the power connection part 138, respectively, so that the housing 120 can be flexibly folded in the direction of the stacking surface.

In this way, instead of stacking battery cells in series and connecting them in series, after placing the battery cells on the lower plate and arranging them in a line and connecting the battery cells in series and physically using the above-described connection plate, in the battery pack according to the present invention, an upper frame is mounted on the front part of the lower plate, and the battery cells are folded in a zigzag while being accommodated in the individual housing to form a cell stack structure. Therefore, in addition to stably fixing and protecting each battery cell by an individual housing, it may have an effect of fundamentally blocking the occurrence of a short due to contact between electrode terminals having different potentials between the series connection of the battery cells forming the conventional cell stack structure.

In addition, since the battery cells are connected in series in the unfolded state, the battery cells can be easily additionally connected if necessary.

In addition, a configuration for connecting a sensing line and a power path for measuring the voltage of each battery cell connected to the BMS to a connection plate that electrically and physically connects the battery cells is formed to be located outside the housing in the same direction, so that connection with the BMS can be facilitated.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

What is claimed is:

1. A battery pack comprising:
   at least two pouch-type battery cells in which respective first and second electrode terminals protrude from one side thereof in the same direction;
   a housing configured to individually surround and fix the battery cells; and
   one or more connection plates disposed between battery cells accommodated in each housing to electrically and physically interconnect adjacent battery cells,
   wherein each connection plate connecting the battery cells is sequentially folded in a predetermined first and second direction to form a cell stack structure of the battery cells, and
   wherein the housing comprises:
   a lower plate having a plate-shaped structure accommodating the first and second electrode terminals; and
   an upper frame having a structure including an opening part with an area corresponding to a front of each battery cell and covering an area where a frame surrounding each battery cell and the first and second electrode terminals of the lower plate are accommodated.

2. The battery pack of claim 1,
   wherein a width of the lower plate corresponds to each battery cell and a length of the lower plate in a vertical direction protrudes from at least one side of each battery cell, the lower plate being where each battery cell is seated; and
   wherein the upper frame is mounted on a front part of each battery cell electrically and physically connected by each connection plate and coupled to the lower plate in a state in which each battery cell is seated on the lower plate.

3. The battery pack of claim 2, wherein each connection plate comprises:
   a second electrode terminal connection part connected to a second electrode terminal of one battery cell and a first electrode terminal connection part connected to a first electrode terminal of another adjacent battery cell in a state in which each battery cell is seated on the lower plate and arranged in a row; and
   a folding part disposed between the first and second electrode terminal connection parts to electrically and physically connect the adjacent battery cells in series,
   wherein a first bending part is formed at a boundary line between the first and second electrode terminals connection part and the folding part.

4. The battery pack of claim 3, wherein each connection plate comprises a sensing line connection part protruding from the second electrode terminal connection part connected to the second electrode terminal of the one battery cell in the same direction as the electrode terminal of each battery cell to be connected to a sensing line for measuring a voltage of each battery cell,
   wherein a second bending part is formed at a boundary line between the second electrode terminal connection part and the sensing line connection part.

5. The battery pack of claim 4, wherein in a state in which each battery cell is accommodated in the housing, the first and second electrode terminal connection parts of the connection plates are located inside the housing, but the folding part and the sensing line connection part are located outside the housing.

6. The battery pack of claim 4, wherein each connection plate is composed of a metal plate or a Flexible Printed Circuit Board (FPCB).

7. The battery pack of claim 3, wherein the folding part is folded in a predetermined first direction or second direction to form the cell stack structure of the battery cells,
 wherein a predetermined interval between the battery cells and a width of the folding part are set differently depending on in which direction the predetermined interval and the width are folded in the first direction or the second direction.

8. A method of manufacturing the battery pack according to claim 1, the method comprising:
 a cell seating operation of seating battery cells to be connected in series on each lower plate;
 a cell arrangement operation of arranging the battery cells seated on each lower plate in a row at a predetermined interval;
 a cell connection operation of electrically and physically connecting the battery cells in series using a connection plate;
 a cell accommodation operation of mounting an upper frame on a front part of each battery cell and accommodating the upper frame in a housing in a state in which the battery cells are connected in series; and
 a cell stacking operation of sequentially folding a folding part of the connection plate connecting the battery cells in a predetermined first and second directions to form a cell stack structure in a state in which the battery cells are stored in each housing.

9. The method of claim 8, further comprising a circuit connection operation of connecting a sensing line to a sensing line connection part after folding the sensing line connection part of the connection plate protruding out of stacked housings to a front surface of the stacked housings and allowing the sensing line connection part to contact the front surface.

10. The method of claim 8, wherein the connection plate is composed of a metal plate or a Flexible Printed Circuit Board (FPCB).

11. The method of claim 8, wherein each battery cell is a pouch-type in which first and second electrode terminals having different polarities protrude in the same direction.

* * * * *